United States Patent
Tang et al.

(10) Patent No.: US 10,724,695 B2
(45) Date of Patent: Jul. 28, 2020

(54) SOLAR-POWERED FLOATABLE LAMP

(71) Applicant: NINGBO SOLAR TECH IMP. & EXP. CO., LTD., Ningbo (CN)

(72) Inventors: Xingao Tang, Ningbo (CN); Kai Zhang, Ningbo (CN)

(*) Notice: Subject to any disclaimer, the term of this patent is extended or adjusted under 35 U.S.C. 154(b) by 0 days.

(21) Appl. No.: 16/385,578

(22) Filed: Apr. 16, 2019

(65) Prior Publication Data
US 2019/0323669 A1    Oct. 24, 2019

(51) Int. Cl.
F21S 9/03        (2006.01)
F21V 31/00       (2006.01)
F21V 23/04       (2006.01)
F21V 5/00        (2018.01)
F21Y 103/33      (2016.01)
F21W 121/00      (2006.01)
F21Y 115/10      (2016.01)

(52) U.S. Cl.
CPC .............. *F21S 9/037* (2013.01); *F21V 5/007* (2013.01); *F21V 23/04* (2013.01); *F21V 31/005* (2013.01); *F21W 2121/00* (2013.01); *F21Y 2103/33* (2016.08); *F21Y 2115/10* (2016.08)

(58) Field of Classification Search
CPC .......................... F21S 9/03–037; F21V 31/005
See application file for complete search history.

(56) References Cited

U.S. PATENT DOCUMENTS

| | | | |
|---|---|---|---|
| 8,337,040 B1* | 12/2012 | Easley | F21L 13/00 362/183 |
| 9,080,736 B1* | 7/2015 | Salzinger | H05B 37/0218 |
| 10,034,072 B2* | 7/2018 | Chen | A63H 23/00 |
| 10,180,221 B1* | 1/2019 | Jeong | F21L 4/08 |
| 2006/0092630 A1* | 5/2006 | Kennedy | F21S 8/00 362/157 |
| 2014/0118997 A1* | 5/2014 | Snyder | F21S 9/037 362/183 |
| 2017/0276303 A1* | 9/2017 | Chen | F21V 23/005 |

FOREIGN PATENT DOCUMENTS

| | | | |
|---|---|---|---|
| CN | 2835784 Y | * | 11/2006 |
| CN | 203442662 U | * | 2/2014 |
| CN | 204161840 U | * | 2/2015 |
| CN | 204187305 U | * | 3/2015 |
| CN | 205480722 U | * | 8/2016 |

* cited by examiner

Primary Examiner — Mariceli Santiago
(74) Attorney, Agent, or Firm — W&K IP (57) ABSTRACT

The present discloses a solar-powered floatable lamp which provides decorative illumination both underwater and above water surface. The lamp comprises a transparent floating component and a lamp component detachably arranged in the floating component. The lamp component comprises a transparent housing, a light emitting component arranged inside the housing, and a solar panel disposed on top of the housing. The solar panel is electrically connected with the light emitting component. The floating component has a mounting socket to fix the lamp component when the floating component is inflated.

8 Claims, 8 Drawing Sheets

SOLAR-POWERED FLOATABLE LAMP

CROSS-REFERENCE TO RELATED APPLICATIONS

This application claims priority to Chinese Patent Application No. 201820558993.8 with a filing date of Apr. 19, 2018. The content of the aforementioned application, including any intervening amendments thereto, is incorporated herein by reference.

TECHNICAL FIELD

The present disclosure relates to the field of light emitting equipment, and more particularly, to a solar-powered floatable lamp.

BACKGROUND

Floatable lamps are used to float above water surface for decorative purposes. Floatable lamps are usually battery-powered, and may comprise rechargeable batteries powered by solar energy. Solar panels in solar-powered floatable lamps must be installed on an upper surface of the lamp component to absorb sunlight. The light emitting components of the prior arts are often disposed on a lower part of the lamp component and so the emitted light would be directed downwards. Since only a small amount of light would be refracted from the water surface, illumination effects may be poor associated with such a floatable lamp.

SUMMARY

An objective of the present disclosure is to solve the problems of the prior arts and provide a floatable lamp enabling illumination of a larger area in water.

An embodiment discloses a solar-powered floatable lamp which comprises a transparent floating component and a lamp component detachably arranged in the floating component. The lamp component comprises a transparent housing, a light emitting component arranged inside the housing, and a solar panel disposed on top of the housing. The solar panel is electrically connected with the light emitting component, and the floating component has a mounting socket to fix the lamp component when the floating component is inflated.

In an embodiment, the mounting socket comprises at least one leak hole.

In an embodiment, the housing includes an outer shell and a lower cover screwed to the outer shell. An O-shaped sealing ring is arranged between the outer shell and the lower cover. The solar panel is arranged on the outer shell. A fixing plate is arranged inside the outer shell. The light emitting component is arranged on the fixing plate. A sealed cavity is formed between the outer shell and the lower cover. A mechanical control switch for controlling the light emitting component is provided inside the sealed cavity.

In an embodiment, the lamp component is enclosed within the floating component, and comprises at least one of a magnetic control switch and an optical control switch to control the light emitting component.

In an embodiment, the light emitting component comprises a plurality of lamp beads uniformly distributed along a circumferential inner wall of the housing.

In an embodiment, a plurality of light refracting ribs are uniformly distributed along a circumferential outer wall of the housing.

In an embodiment, the lamp further comprises a processer coupled to the light emitting component and a wireless communication component coupled to the processor to control the light emitting component.

In an embodiment, the floating component comprises an aperture.

In an embodiment, each of the plurality of lamp beads emits light onto at least one of the plurality of light refracting ribs in a radical direction of the outer shell.

In an embodiment, the number of the light refracting ribs is three times the number of the lamp beads.

In an embodiment, a distance between two adjacent lamp beads of the plurality of light refracting ribs is between 2.5 cm and 3 cm.

In an embodiment, a height of the housing is equal to a radius of the housing.

In an embodiment, the radius of the housing is 3.5 cm

The embodiments of the present disclosure enable light emission from the side of the lamp and provide decorative illumination both underwater and above water surface.

BRIEF DESCRIPTION OF THE DRAWINGS

The present invention is illustrated by way of example and not limitation in the figures of the accompanying drawings, in which like references indicate similar elements, and in which.

REFERENCE LABELS

1 floating component, 2 lamp component, 3 housing, 4 light emitting component 5 solar panel, 6 mounting socket, 7 leak hole, 8 outer shell, 9 lower cover, 10 control switch, 11 refracting ribs, 12 aperture, 13 O-shaped sealing ring, 14 fixing plate, 15 mounting ring

DETAILED DESCRIPTION

Exemplary embodiments are provided such that the disclosure will be thorough, and will fully convey the scope to those who skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
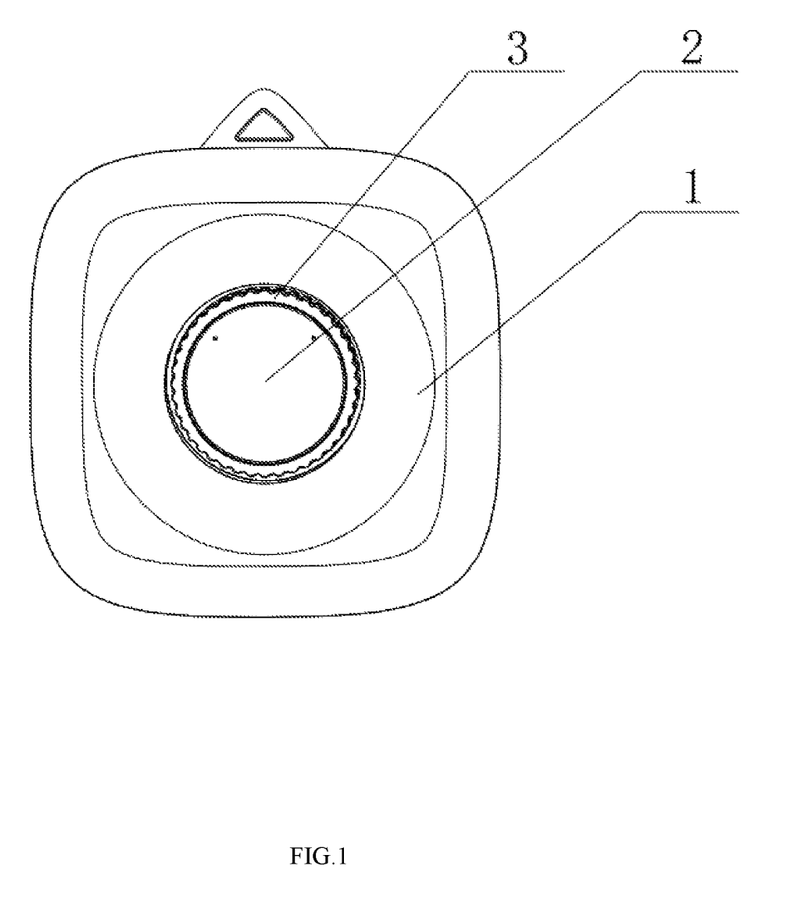
FIG. 1 is a structural schematic diagram of a solar-powered floatable lamp according to an embodiment.
Figure 2:
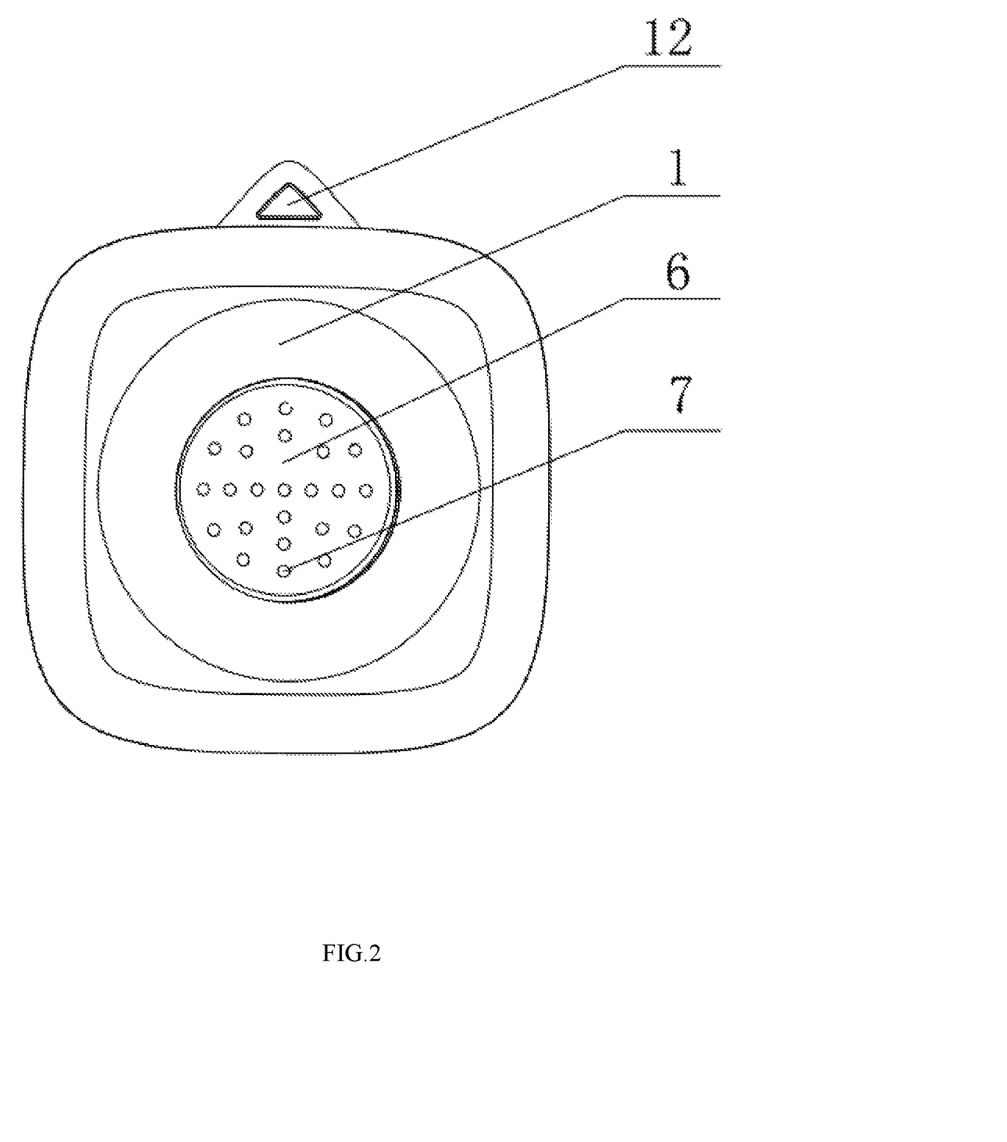
FIG. 2 is a structural schematic diagram of a floating component of a solar-powered floatable lamp according to an embodiment.
Figure 3:
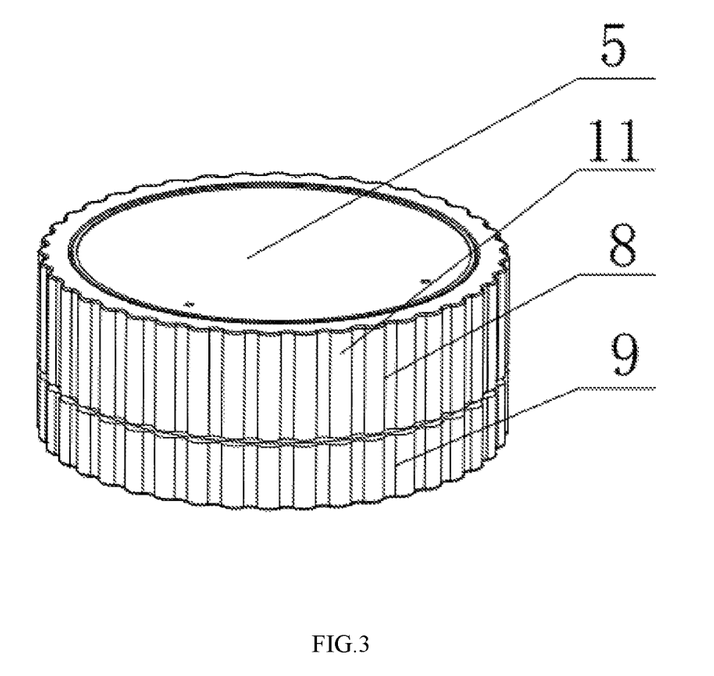
FIG. 3 is a structural schematic diagram of a lamp component of a solar-powered floatable lamp according to an embodiment.
Figure 4:
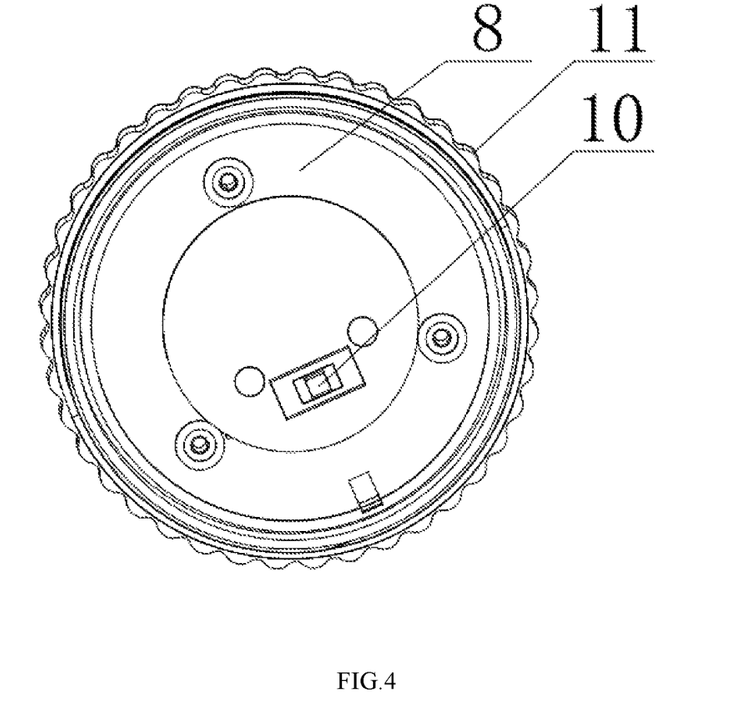
FIG. 4 is a structural schematic diagram of a lamp component with its lower cover removed according to an embodiment.

As shown in FIG. 1, the present disclosure relates to a solar-powered floatable lamp comprising a floating component 1 and a lamp component 2 connected to the floating component 1 by various approaches. The floating component 1 may be transparent. In a first embodiment, a mounting socket 6 is arranged on the floating component 1 and the lamp component 2 is partly embedded in the mounting socket 6. The mounting socket 6 limits the lamp component 2 when the floating component 1 is inflated. The lamp component 2 can be removed by releasing the air inflated inside the floating component 1. The mounting socket 6 comprises at least one leak hole 7 to drain water inside the mounting socket 6. In a second embodiment, the lamp component 2 is completely embedded in the floating component 1 so that it may not be removed from the floating component 1. In addition, an aperture 12 is also arranged on the floating component 1 in both embodiments, so that the floating component 1 can be hung in other positions such as a tree, a house, or the like. Further, the structures of the lamp component 2 of the two embodiments may vary.

Because the lamp component 2 is detachably disposed on the floating component 1, it is necessary to open the housing 3 for controlling the lamp. The housing 3 may be transparent and include an outer shell 8 and a lower cover 9. At least one circuit board and at least one integrated circuit component can be arranged in the outer shell 8. Although not shown, the skilled in the art will anticipate the circuit board and the integrated circuit component are needed to implement certain programmable functions or control mechanisms in the lamp. The outer shell 8 and the lower cover 9 are connected by a threaded connection. An O-ring 13 is disposed between the outer shell 8 and the lower cover 9. The solar panel 5 is disposed on the outer shell 8. The outer shell 8 is provided with a fixing plate 14. The light emitting component 4 is disposed on the fixing plate 14 A sealed cavity can be formed between outer shell 8 and the lower cover 9. A control switch 10 is provided on the outer shell 8 in the sealed cavity. The control switch 10 is generally configured as a mechanical switch, so that the user only needs to open the lower cover 9 to conveniently turn on or off the light emitting component 4. When the lower cover 9 is closed, the cavity where the control switch 10 is located is completely sealed to ensure waterproofness.

Because the lamp component 2 of the second embodiment is fixed in the floating component 1, manual operation of the lamp component 2 may be beyond reach. Therefore, the present disclosure comprises a light control switch or a magnetic control switch in the lamp component 2. The light control switch uses the solar panel 5 to detect any light irradiation. If there is light irradiation, the light emitting component 4 would be turned off. If there is no light irradiation, the light emitting component 4 would be turned on to emit light after a certain period of time. The magnetic control switch is controlled by an external magnet. Using these two control modes, the light emitting component 4 can be controlled without opening the housing 3, and the lamp component 2 fixed in the floating component 1 can be operated conveniently.

The structures of the lamp components 2 of the two embodiments are similar in that a solar panel 5 is arranged on top of the housing 3 and a rechargeable battery connected to the solar panel 5 is arranged inside. The light emitting component 4 is arranged on the side of the housing 3 such that light emitted by the light emitting component 4 would be transmitted from the sides of the housing 3 and the floating component 1.

Figure 5:
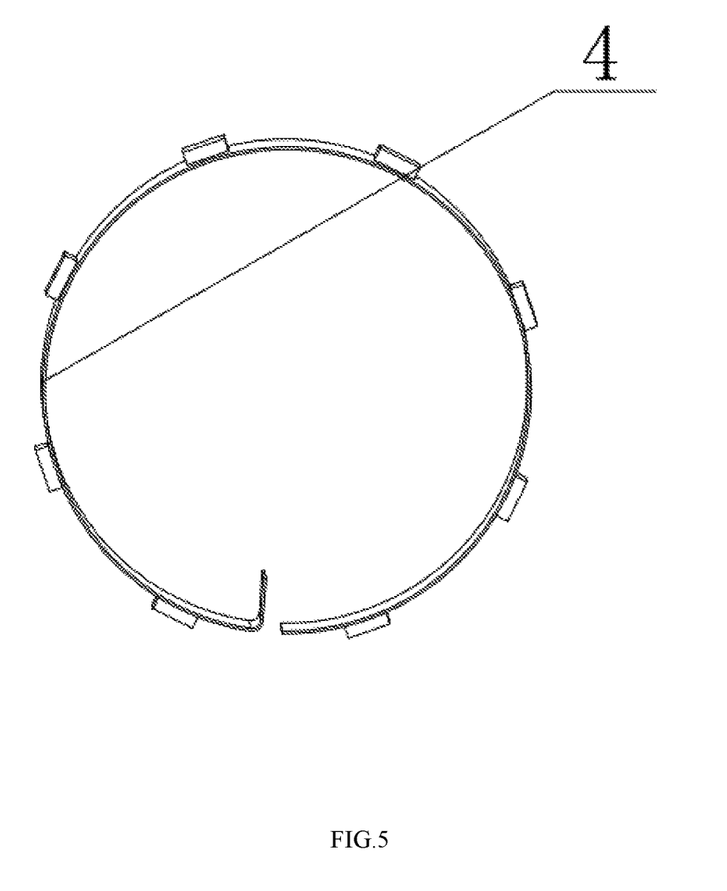
FIG. 5 is a structural schematic diagram of a light emitting component of a solar-powered floatable lamp according to an embodiment.
Figure 6:
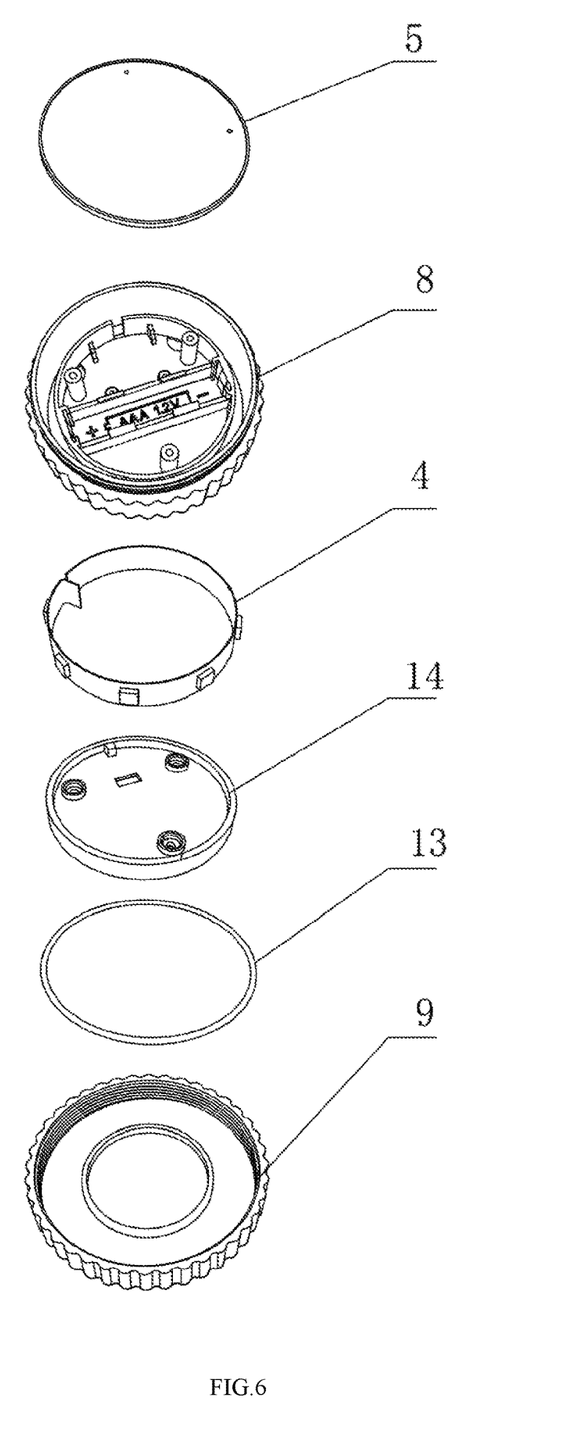
FIG. 6 is an explosive view of a lamp component of a solar-powered floatable lamp according to an embodiment.
Figure 7:
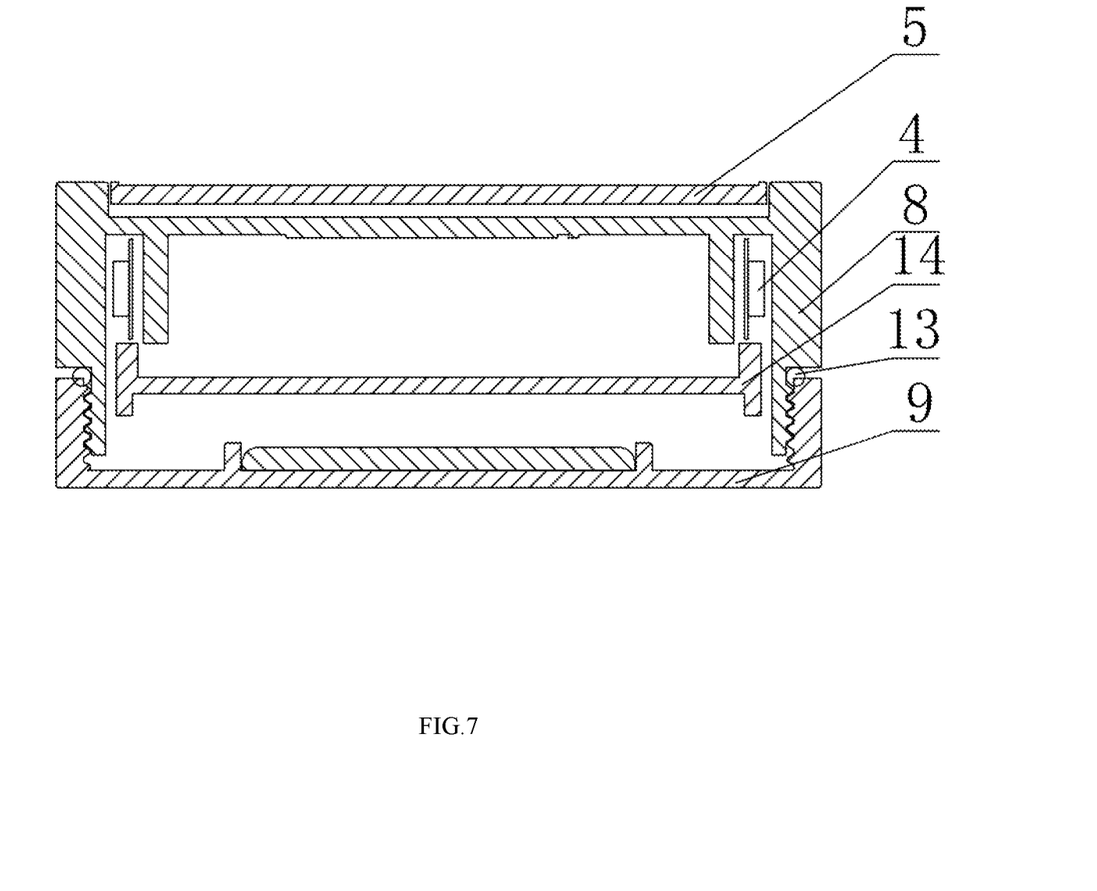
FIG. 7 is a cross-sectional view of a lamp component of a solar-powered floatable lamp according to an embodiment.

The light emitting component 4 of the embodiments comprises a plurality of lamp beads uniformly distributed along a circumferential inner wall of the housing 3. For one example, the light emitting component 4 can comprise a flexible FPC distributed along a circumferential inner wall of the housing 3 and a plurality of LED lamp beads uniformly arranged on the flexible FPC. For another example, the light emitting component 4 can comprise a flexible aluminum substrate distributed along a circumferential inner wall of the housing 3 and a plurality of COB lamp beads uniformly arranged on the flexible aluminum substrate. For yet another example, the light emitting component 4 can comprise copper-wired rice lights distributed along a circumferential inner wall of the housing 3.

In the lamp component 2, a processor and a wireless communication component may also be included to enable remote operation. The wireless communication component and the light emitting component 4 are all electrically connected to the processor. The wireless communication component may be a radio frequency (RF) module communicatively coupled to a remote controller to control the light emitting component 4. The wireless communication component may be a Bluetooth communication module or an infrared communication module, and the light emitting component 4 can be operated through a peripheral smart terminal (such as a mobile phone or a tablet computer).

A plurality of light refracting ribs 11 are uniformly distributed along a circumferential outer wall of the housing 3. The light refracting ribs 11 act as lens to refract the light emitted by the light emitting component 4 as well as a mechanism to facilitate grabbing. The number of the light refracting ribs is three times the number of the lamp beads in one embodiment. That is to say, the distance between two adjacent lamp beads is three times the distance between two adjacent light refracting ribs so that a uniform distribution of radical illumination could be achieved. In an embodiment, the distance between two adjacent lamp beads is between 2.5 cm and 3 cm and the distance between two adjacent light refracting ribs is between 0.83 cm and 1 cm. The height of the housing 3 can be equal to the radius of the housing 3 to position the lamp beads approximately at the water surface. The radius of the housing 3 is 3.5 cm in one embodiment.

Figure 8:
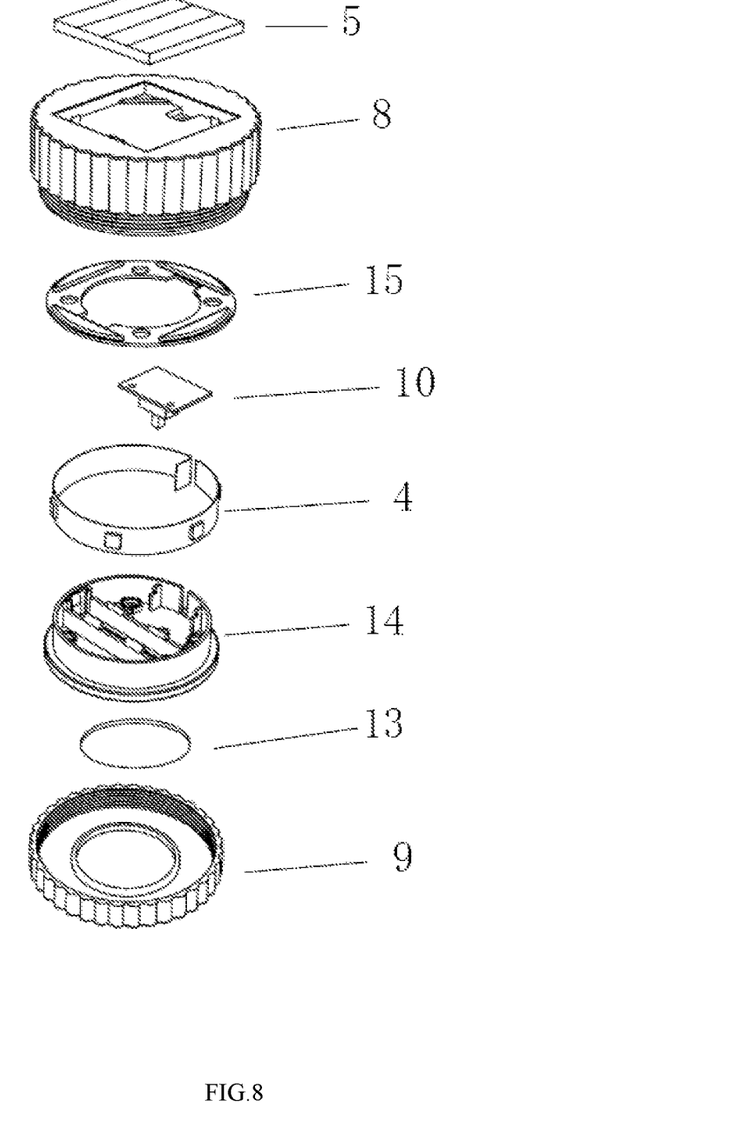
FIG. 8 is an explosive view of a lamp component of a solar-powered floatable lamp according to an embodiment.

As shown in FIG. 8, a mounting ring 15 can be placed between the outer shell 8 and the fixing plate 14. The mounting ring 15 comprises four vias on its corners for connecting to the fixing plate 14. The mounting ring 15 may comprise an opening in the middle to place a COB (chip on board) LED unit therein. The COB LED unit can be configured to emit light in an axial direction of the lamp in addition to the light emitting component 4 which emits light in radical directions of the lamp.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A solar-powered floatable lamp, comprising:

a transparent floating component and a lamp component detachably arranged in the floating component, wherein the lamp component comprises a transparent housing, a light emitting component arranged inside the housing, and a solar panel disposed on top of the housing, the solar panel is electrically connected with the light emitting component, and the floating component has a mounting socket to fix the lamp component when the floating component is inflated;

wherein the mounting socket comprises at least one leak hole;

wherein the housing includes an outer shell and a lower cover screwed to the outer shell, an O-shaped sealing ring is arranged between the outer shell and the lower cover, the solar panel is arranged on the outer shell, a fixing plate is arranged inside the outer shell, the light emitting component is arranged on the fixing plate, a sealed cavity is formed between the outer shell and the lower cover, and a mechanical control switch for controlling the light emitting component is provided inside the sealed cavity;

wherein the lamp component is enclosed within the floating component, and comprises at least one of a magnetic control switch and an optical control switch to control the light emitting component;

wherein the light emitting component comprises a plurality of lamp beads uniformly distributed along a circumferential inner wall of the housing;

wherein a plurality of light refracting ribs are uniformly distributed along a circumferential outer wall of the housing.

2. The lamp of claim 1, further comprising a processer coupled to the light emitting component and a wireless communication component coupled to the processor to control the light emitting component.

3. The lamp of claim 2, wherein the floating component comprises an aperture.

4. The lamp of claim 3, wherein each of the plurality of lamp beads emits light onto at least one of the plurality of light refracting ribs in a radical direction of the outer shell.

5. The lamp of claim 4, wherein the number of the light refracting ribs is three times the number of the lamp beads.

6. The lamp of claim 5, wherein a distance between two adjacent lamp beads of the plurality of light refracting ribs is between 2.5 cm and 3 cm.

7. The lamp of claim 6, wherein a height of the housing is equal to a radius of the housing.

8. The lamp of claim 7, wherein the radius of the housing is 3.5 cm.

* * * * *